Patented Mar. 27, 1923.

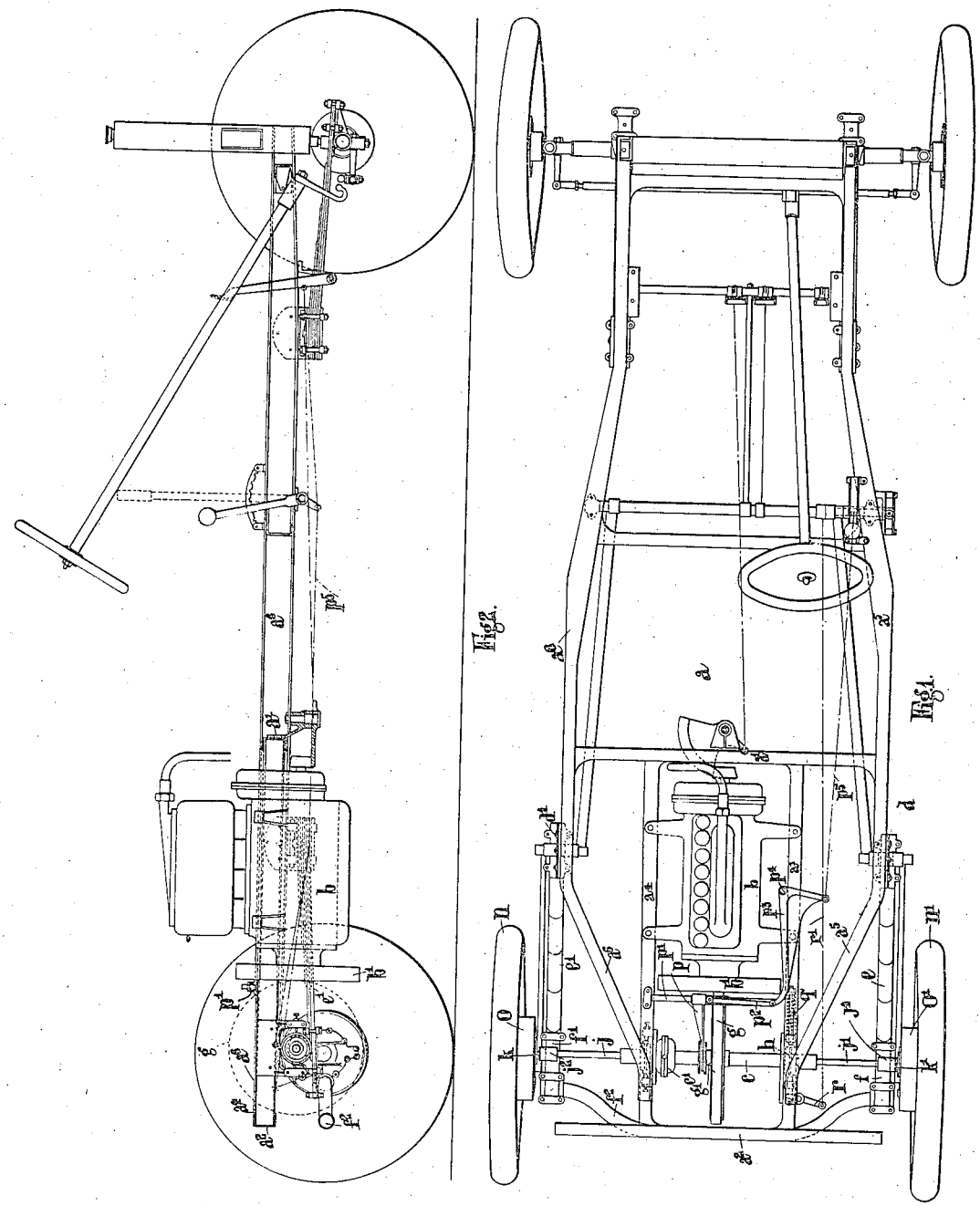

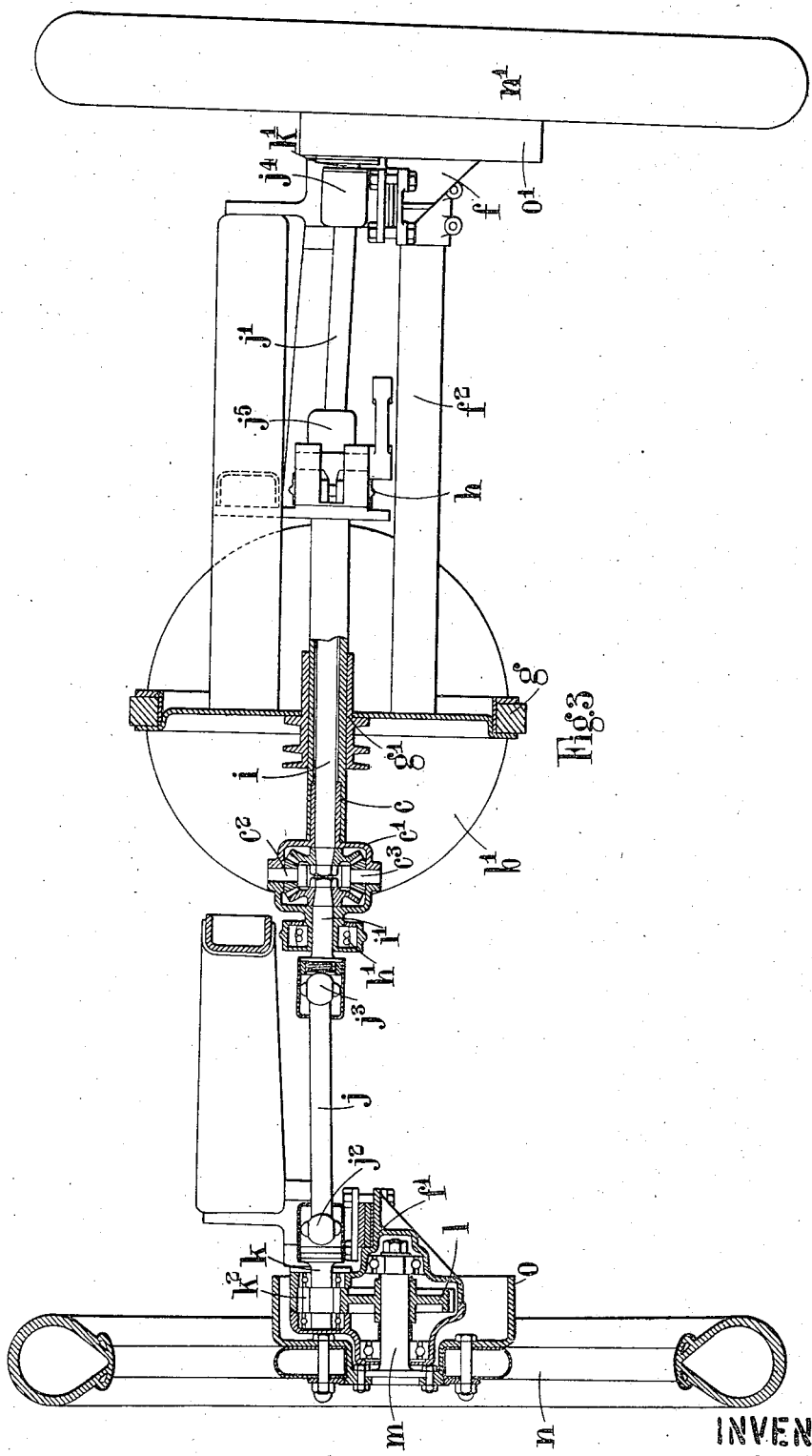

UNITED STATES PATENT OFFICE.

ARTHUR GEORGE GRICE, OF MAIDENHEAD, ENGLAND, ASSIGNOR OF ONE-HALF TO G. & V. R. LIMITED, OF MAIDENHEAD, BERKS COUNTY, ENGLAND.

MOTOR VEHICLE.

Application filed October 15, 1918. Serial No. 258,309.

(GRANTED UNDER THE PROVISIONS OF THE ACT OF MARCH 3, 1921, 41 STAT. L., 1313.)

*To all whom it may concern:*

Be it known that I, ARTHUR GEORGE GRICE, a subject of the King of Great Britain and Ireland, and residing at Cordwalles Works, Maidenhead, in the county of Berks, England, have invented certain new and useful Improvements in and Relating to Motor Vehicles (for which I have filed applications in England Feb. 3, 1917, Patent No. 108,431; in France January 26, 1918, and in Canada June 13, 1918), of which the following is a specification.

This invention relates to motor vehicles having driving gear of the type in which power is transmitted from a motor shaft to a transverse axle by an axially movable rim friction wheel co-acting with a face friction disc for varying the speed ratio.

The principal object of the invention is to provide a compact and easily arranged and constructed gear and framing of this type.

The invention consists in a driving gear of the type indicated, in which the axis of the driving element of the two co-operating friction members substantially coincides with the axis of the vehicle, and the driven element whose axis is parallel to and above the axis of the road wheels transmits a direct rotational drive to the casing or frame carrying the intermediate pinions of a differential gear, through which the power is distributed to said road wheels.

The invention also consists in the improvements in and relating to motor vehicles and driving gear therefor as hereinafter described.

Referring now to the accompanying drawings:—

Figure 1 is a plan view of a motor chassis showing one way in which the invention may be carried into effect.

Figure 2 is a longitudinal view partly in section, looking in the direction of the arrow 2 of Figure 1.

Figure 3 is a back view partly in section and looking in the direction of the arrow 3 in Figure 1.

In the accompanying drawings, which show by way of example one way of carrying the invention into effect, $a$ is a motor road vehicle chassis in which the back portion comprises a rectangular frame formed of the members $a^1$, $a^2$, $a^3$ and $a^4$, upon which an engine $b$ and transverse shaft $c$ are carried.

The member $a^2$ of the frame is extended upon each side thereof and the member $a^1$ is also extended for the purpose of connecting it to the main longitudinal members $a^5$ and $a^6$ of the chassis. The longitudinal members $a^5$ and $a^6$ are turned in at their rearward ends and attached to the members $a^3$ and $a^4$ of the frame.

Depending from the longitudinal members $a^5$ and $a^6$ are brackets $d$ and $d^1$ carrying elliptic springs $e$ and $e^1$ to which are connected axle casings $f$, $f^1$, firmly attached to the opposite ends of the cranked tubular axle member $f^2$. Said casings constitute an enclosed oil bath for the reducing gearing hereinafter described.

The engine $b$, whose longitudinal centre coincides with the longitudinal axis of the vehicle, has its flywheel $b^1$ formed on its outer face as a friction driving disc and in driving contact with this disc is a friction rim wheel $g$ carried upon a sleeve $g^1$ sliding upon and in driving connection with the hollow shaft $c$.

The shaft $c$ is supported in bearings $h$, $h^1$, carried by the frame members $a^3$ and $a^4$, and it is provided adjacent to the member $h^1$ with a casing $c^1$ carrying the pinions $c^2$, $c^3$ of a differential gear connecting the two portions $i$ and $i^1$ of a transverse shaft.

The transverse shaft is connected by means of intermediate shafts $j$ and $j^1$ and flexible connections $j^2$ and $j^3$, $j^4$ and $j^5$, with the pinion shafts $k$, $k^1$, supported in the axle casings $f^1$ and $f$ and each carrying the pinions such as $k^2$. Both pinions gear with wheels such as $l$ carried upon axles such as $m$ supported in the axle casings $f^1$ and $f$ substantially vertically below or slightly rearward of the pinion shafts $k$, $k^1$. To the axle shafts are connected the road wheels $n$ and $n^1$, which are provided with suitable brake drums $o$, $o^1$.

The rim friction wheel $g$ is held in contact with the driving face of the flywheel $b^1$ by means of a spring $q$ acting upon the bearing $h$ of the shaft $c$, the pressure being regulated by means of the lever $r$ operated by the tension member $r^1$ from a suitable control, after the manner described in British patent specification No. 21,228 of 1911.

The wheel $g$ is moved upon the shaft $c$ by its slide $g^1$ through the intermediary of the sliding arm $p$ carried on the guide $p^1$ and operated by means of the link $p^2$ and bell-crank lever $p^3$ which is fulcrumed at $p^4$ and actuated from a suitable control by means of a tension member $p^5$.

By supporting the friction members and differential gear upon the chassis frame and distributing power to the road wheels through flexible connections as described the wear and tear on the rear road wheel covers, such as occurs when axles of the rigid type are employed, is practically eliminated.

Other modifications in the arrangement and construction of the parts may also be adopted without in any way departing from the spirit of this invention.

Having now described my invention, what I claim as new and desire to secure by Letters Patent is:—

1. A driving gear for motor vehicles comprising in combination main and secondary rigidly connected frames, a transverse shaft including two sections journalled in said secondary frame, a sleeve surrounding the transverse shaft, a differential gearing housing carried with the sleeve, differential gearing mounted in the housing and on the adjacent ends of the shaft sections, a friction driving disc mounted for rotation in the secondary frame, a driven disc slidable on but fixed to rotate with the sleeve and co-acting with the driving disc, casings yieldably supported from the main frame, rear wheel carrying axles journalled in the casings, reduction gearing mounted in the casings and associated with the rear wheel carrying axles and flexible driving connections between the ends of the transverse shaft sections and the reduction gearing, substantially as and for the purpose set forth.

2. A driving gear for motor vehicles comprising in combination a main vehicle frame, a secondary frame rigidly connected in horizontal alignment thereto, an engine supported by the secondary frame the fly wheel of which serves as a main driving disc, bearings mounted in the sides of the secondary frame, a transverse shaft including two aligning sections, a sectional sleeve arranged about the shaft sections and journaled in the bearing, a differential housing formed with the sleeve sections, differential gearing mounted in the housing and on the adjacent ends of the shaft sections, a driven disc slidably and non-rotatably mounted on the sleeve, casings, means for resiliently supporting said casings from the sides of the main frame, rear wheel carrying axles journalled in said casings, reduction gearing mounted in the casings and associated with the axles, and flexible driving connections between the transverse shaft sections and the reduction gearing.

3. An arrangement as claimed in claim 2 wherein the outer ends of the transverse shaft sections project beyond the bearings in the sides of the secondary frame and wherein the flexible driving connections include shaft sections having their respective ends universally connected with the reduction gearing in the casings and with the projecting ends of the transverse shaft sections.

4. An arrangement as claimed in claim 2, wherein the means for resiliently supporting the reduction gearing casing includes a cranked axle mounted in the rear end of the secondary frame and elliptical springs having their rear ends connected to the ends of the axle and their forward ends connected to the side bars of the frame and having attached thereto the casings.

In testimony whereof I have signed my name to this specification.

ARTHUR GEORGE GRICE.